July 26, 1938.  E. ZURCHER  2,125,095
CIRCUIT CONTROLLING DEVICE
Filed Nov. 2, 1934  2 Sheets-Sheet 1

Inventor:
Ernest Zurcher,
by Harry E. Dunham
His Attorney.

July 26, 1938.  E. ZURCHER  2,125,095

CIRCUIT CONTROLLING DEVICE

Filed Nov. 2, 1934  2 Sheets-Sheet 2

Inventor:
Ernest Zurcher,
by Harry E. Dunham
His Attorney.

Patented July 26, 1938

2,125,095

UNITED STATES PATENT OFFICE 2,125,095

CIRCUIT CONTROLLING DEVICE

Ernest Zurcher, Schenectady, N. Y., assignor to General Electric Company, a corporation of New York Application November 2, 1934, Serial No. 751,168

23 Claims. (Cl. 200—81)

My invention relates to circuit controlling devices of the type used for the combined automatic and manual control of electrical apparatus, such for example, as refrigerators, and has for an object the provision of inexpensive, reliable means for operating a circuit controlling device to carry out a plurality of different control functions.

While not limited thereto, my invention is particularly applicable to circuit controlling devices of the type shown in Letters Patent to Hutt Nos. 1,637,042 and 1,974,991, dated respectively July 26, 1927 and September 25, 1934. The devices shown in the aforementioned patents are entirely suitable for their intended purposes, but leave something to be desired in a control device occupying a minimum amount of space and which at the same time carries out additional controlling functions in accordance with a variety of desired operating conditions.

It is therefore a further object of my invention to provide a simple and inexpensive refrigerator control device for controlling the refrigerator motor so as to maintain a predetermined average temperature in the refrigerator but which device can be adjusted at will to maintain within fixed limits for a limited time a defrosting temperature above and a quick freezing temperature below the predetermined average temperature.

Another object of my invention is to provide at all times compensated overload protection for the refrigerator motor of such character that the motor can be operated at full load, but not above full load, notwithstanding changes in the ambient temperature.

In carrying out my invention in one form thereof as applied to refrigerators, I provide a control device with an expansible bellows responsive to the temperature of the refrigerator for moving against the bias of an adjustable temperature control spring a switch operating member. This temperature responsive movement of the switch operating member opens and closes the refrigerator motor circuit to maintain a predetermined average temperature in the refrigerator. By adjusting the temperature control spring the average temperature can be raised or lowered within predetermined limits. In order to raise the temperature of the refrigerator for a limited time a torsion spring under manual control opposes the movement of the switch member by the bellows. An oppositely acting torsion spring under manual control assists the bellows to hold the switch closed so that a quick freezing temperature is produced within the refrigerator. In case the switch is in the open circuit position at the time the control device is set for a quick freezing operation, provision is made to close the switch at once so that the lowering of the temperature in the refrigerator occurs in a minimum amount of time. A suitable compensating means is provided for the torsion springs so that the upper and lower limits of temperature in the refrigerator are always substantially the same irrespective of the adjustment of the temperature control spring. The manual control for initiating the defrosting and quick freezing operations is provided with automatic means for terminating the quick freeze and defrost operations.

In a further aspect of my invention I provide an ambient temperature compensated overload device operated by a single opening spring to open the circuit in response to a predetermined motor current. The opening spring also automatically resets the overload device. The control switch is trip-free at all times, that is to say, it cannot be maintained in the closed circuit position in case of an overload, irrespective of the positions of a manual operating means. The manual operating means itself forms a part of the overload device and includes a pair of three surface cams which cooperate with each other and with the opening spring to provide quick opening of the contacts.

For a more complete understanding of my invention, reference should now be had to the drawings, wherein I have shown in Fig. 1 a plan view of my invention applied to a refrigerator control switch with the cover removed.

Referring to the drawings, I have shown my invention in one form as applied to a refrigerator control device 10 mounted in a molded box 12 formed of insulating material. The refrigerator motor circuit is controlled by a pair of contacts 14 and 16, the contact 14 being supported on a stationary conductor 17 secured in place by means of a brass conducting screw 18 which screw also serves to clamp a conductor 19 against an end wall 20 of the box 12. A screw 22 serves to clamp into electrical engagement with the conductor 19 a terminal 23. The other side of the refrigerator motor control leading to the circuit controlling device 10 is by way of a terminal screw (not shown) mounted directly below the terminal screw 22 and electrically connected to a conductor 24. The remainder of the circuit through the control device will be described more in detail in connection with the overload operation of the device.

Figure 1:
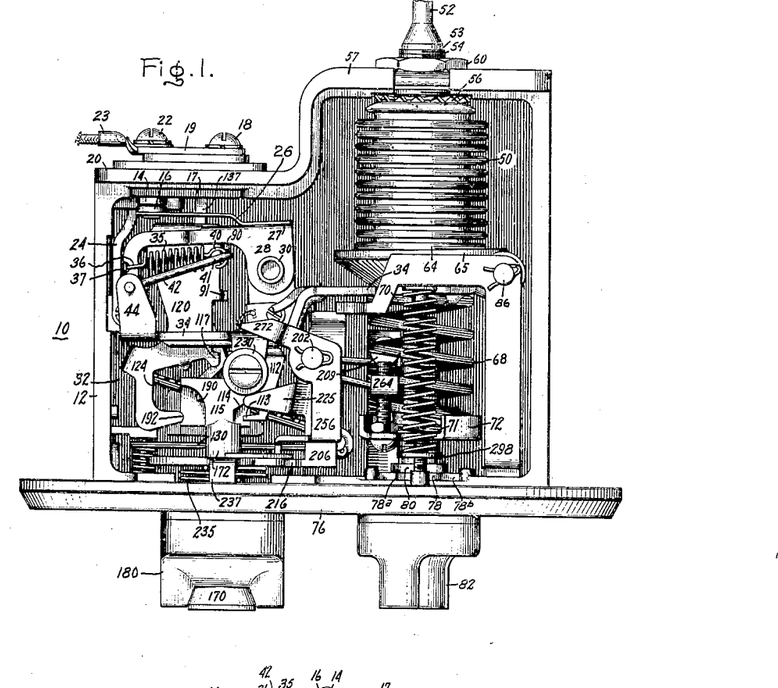
Figure 2:
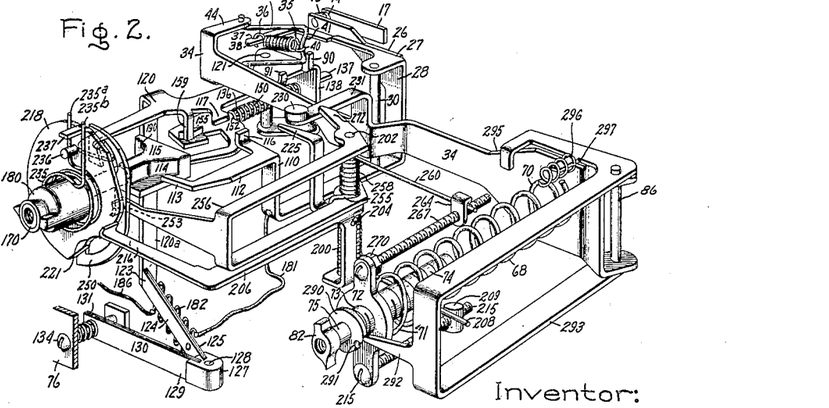
Fig. 2 is an exploded perspective view of the operating mechanism shown in Fig. 1.

The movable contact 16 is mounted on a resilient conductor 26 preferably formed of bronze secured at one end 27 to a contact operating member 28. The contact operating member 28 is pivotally mounted upon a post 30, the lower end of which is molded integrally with the side wall 32 of the box 12. The movable contact 16 is operated between open and closed circuit positions by means of a pivoted operating lever 34 and an over-center spring mechanism comprising an over-center spring 35 having one end 36 supported in a recess 37 provided in an extension 38 formed integrally with the contact operating member 28. The other end 40 of the over-center spring is supported on the closed end 41 of a U-shaped floating lever 42, the respective legs of the lever 42 being pivotally mounted in a U-shaped end 44 provided on the operating lever 34. As shown in Figs. 1 and 2 the force of the over-center spring is applied to the contact operating member in a clockwise direction to hold the movable contact 16 in the closed circuit position.

The operation of the movable contact 16 is determined as a function of the temperature of the refrigerator by means of a bulb (not shown) filled with a fluid having a low boiling point, such for example as methyl chloride or sulphur dioxide, the bulb being connected to a sylphon or expansible bellows 50 by means of a tube 52, which is soldered at 53 to one end 54 of the bellows 50. A lock-washer 56 located between the bellows 50 and an end wall 57 of the box 12 cooperates with a lock-nut 60 mounted on the portion 54 of the bellows extending through the end wall 57, to fasten rigidly and securely the bellows in a fixed position. The opposite movable end 64 of the bellows bears against a centering washer 65 formed of insulated material, the centering washer serving the function of transmitting the pressure exerted by the bellows 50 against the operating lever 34 and insulating the bellows from the control device.

In order to control the operation of the device 10 so as to provide for different average temperature in the refrigerator, a temperature control spring 68 is mounted to oppose the expansion of the bellows 50. Thus, one end 70 of the spring 68 bears against the operating lever 34 while the opposite end 71 of the spring is mounted in a spring seat 72 having its inner portion 73 threaded to receive a screw 74. One end 75 of the screw 74 extends through an end wall 76 of the box 10, the tendency for the outward movement of the screw 74 under the influence of the spring 68 being opposed by means of a U-shaped locking member 78 having its respective legs 78a and 78b nesting on opposite sides of a collar 80 formed integrally with the screw 74. The compression of the temperature control spring 68 is varied by rotating a temperature control knob 82 secured on the end 75 of the screw 74. The spring 68 and the bellows 50 together form a flexible means for moving the pivoted operating lever 34 between open and closed circuit positions.

As shown in Figs. 1 and 2, the contacts 14 and 16 are in the closed circuit position with the refrigerator control circuit energized. The refrigerator motor is therefore in operation. As the temperature of the refrigerator is decreased by the refrigerating apparatus, it will be understood that the pressure of the bellows 50 is correspondingly decreased so that the temperature control spring 68 moves the operating lever 34 about its pivot 86 in a clockwise direction, as viewed in Figs. 1 and 2. As the end 44 of the lever 34 moves towards the end 36 of the over-center spring 35, energy is stored in the spring so that the moment the pivoted end of the U-shaped floating lever passes beyond the end 36 of the spring, the total energy of the spring quickly operates the floating lever 42 from its position against a stop 90 to a position against a stop 91. The line of action of the spring is thereby shifted to the opposite side of the pivot 30 to operate the member 28 in a counter-clockwise direction. The result, of course, is that the movable contact 16 is operated to the open circuit position with a snap action.

Since the movement of the operating lever 34 depends upon the difference between the pressures exerted upon it by the temperature control spring 68 and the bellows 50, it will be obvious that the temperature setting of the device can be varied by changing the compression of the spring 68. For example, by rotating the knob in a counter-clockwise direction as viewed in Figs. 1 and 2 the spring seat 72 is moved in a direction to compress the spring 68. As the spring pressure is increased the temperature required in the refrigerator for the operation of the switch is correspondingly increased. Only a limited adjustment of the temperature control spring 68 is ordinarily provided so that the upper and lower temperature limits of normal operation are fixed.

In addition to the normal operation of the device between open and closed circuit positions, I provide for both manual and overload operation of the device to the open circuit position. For the sake of simplicity of explanation, a portion of the mechanism for accomplishing these operations will now be described in detail.

The manual and overload separation of the contacts is effected by movement of an extension 110 (Fig. 2) formed integrally with the contact operating member 28. The extension is provided with a U-shaped end 112, one leg 113 of which is operatively associated with one face 114 of a cam 115 while the other leg 116 is arranged for cooperation with a projection 117 provided on an overload tripping lever 120 pivoted at 121. The stops 90 and 91 for the floating lever 42 are formed integrally with this tripping lever. Normally the tripping lever 120 is restrained in the position shown in Figs. 1 and 2 by means of a current responsive bimetallic thermal element 124, the opposite end 125 of which is rigidly secured to an insulating member 127 pivoted at 128. The insulating member 127 also rigidly secures one end 129 of an ambient temperature responsive bimetallic element 130 the opposite end 131 of which is provided with an opening through which extends an adjusting screw 134, the adjusting screw extending through the end 76 of the box 12.

Figure 10:
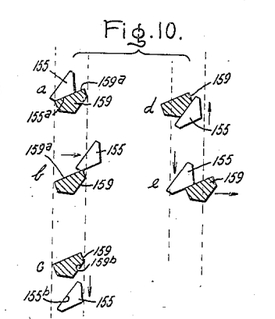
Figs. 10a to 10e, inclusive, are enlarged detail views of the three surface cams illustrating their position with respect to each other under various circuit controlling positions.
Figure 11:
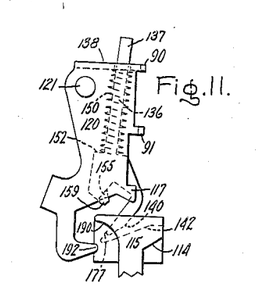
Figs. 11 and 12 are plan views showing a portion of the overload mechanism in different positions.
Figure 12:
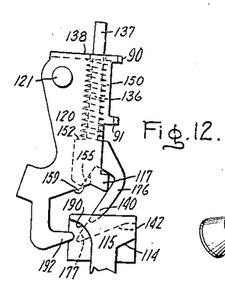
Figure 13:
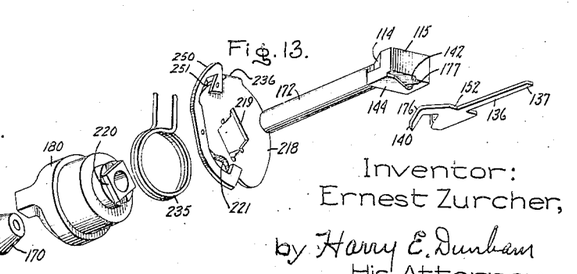
Fig. 13 is an exploded perspective view of that part of the circuit controlling device shown in Fig. 1 which is directly associated with the manual operating means.

Associated with the tripping lever 120 is a plunger or releasing member 136, one end 137 of which extends through an opening provided in an angular portion 138 of the tripping lever 120, the opening being located to one side of the pivot pin 121. As shown in Figs. 11-13, inclusive, the opposite end of the plunger 136 is provided with a rounded end 140 arranged in nesting relation with an angular notch 142 provided in the lower portion 144 of the cam 115. A normally compressed spring 150 encircling the plunger 136 biases the plunger for movement towards the cam 115 by reason of the engagement of one end of the spring with the inner side of the angular portion 138 of the tripping lever 120 and the engagement of the opposite end of the spring with a shoulder 152 formed integrally with the plunger 136. As shown in Figs. 2 and 11 the longitudinal movement of the plunger is prevented by a latching means comprising a three surface cam 155 carried by the plunger, one surface 155a of the cam bearing against a surface 159a of a second three surface cam 159 formed integrally with the tripping lever 120. When the cams are engaged, only a small component of the force of the spring is effective to bias the tripping lever 120 against the thermal element 124. As shown in Figs. 10 and 11, the three surface plunger cam 155 and the overload cam 159 are designed so that their adjoining surfaces 155a and 159a are at such an angle with respect to the direction of movement of the plunger that only the small component of force from the spring 150 acts on the cam 159 in a direction to rotate the tripping member 120 in a counter-clockwise direction about its pivot 121. It is this small component of the force of the spring which is resisted by the bimetal element 124. It should be here observed that movement of the plunger cam 155 in a clockwise direction, as viewed in Fig. 11, is prevented by the engagement of its end 140 with the notch 142 provided in the lower surface of the cam 115.

Figure 3:
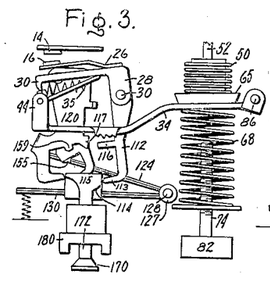
Figs. 3, 4, and 5 are fractional plan views of the switch mechanism in different circuit controlling positions.

In order to open manually the circuit controlling device it is only necessary to pull on a button 170 to operate it in a longitudinal direction from the position shown in Figs. 1 and 2 to the position shown in Fig. 3. It will be observed that the button 170 is secured to an extension 172 formed integrally with the cam 115. As the button 170 is moved longitudinally the cam 115 is moved from the position shown in Fig. 11 to the position shown in Fig. 12, one side 176 of rounded plunger 140 being engaged by the inclined surface 177 of the angular notch 142 to cause rotation of the plunger 136 in a counter-clockwise direction as viewed in Fig. 11. In Fig. 12 the plunger 136 has been rotated an amount just insufficient to move the plunger cam 155 out of engagement with the overload cam 159, a corresponding enlarged view of the cam being shown in Fig. 10b. As soon as the button 170 is moved a slight additional distance the plunger cam 155 frees itself from the overload cam 159 so that the spring 150 is free to move the plunger 136 towards the button 170.

The operator upon first moving the button 170 feels a substantial amount of resistance against the longitudinal movement, this resistance being sufficient to cause a substantial pull on the knob. As soon, however, as the plunger cam 155 has cleared the overload cam 159 this resistance is instantaneously removed so that the button 170 is quickly jerked to its outermost position. Immediately after the plunger and overload cams are disengaged the surface 114 of the cam 115 engages the leg 113 of the contact operating member 28 to operate quickly the contact 16 to the open circuit position by reason of the leg 113 riding up the inclined surface 114. The force of the spring 150 remains effective to hold the button 170 in the open circuit position shown in Fig. 3, the open circuit positions of the three surface cams 155 and 159 being shown in Fig. 10c.

In order to reclose the device 10, the button 170 is pushed longitudinally from the position shown in Fig. 3 to the position shown in Figs. 1 and 2, the plunger 136 being moved with the button 170 by reason of the engagement of the plunger end 140 with the notch 142. The cam 115 is moved out of engagement with the extension 113 of the contact operating member 28 permitting the reclosure of the contacts by the over-center spring 35. As the plunger cam 155 is moved into engagement with the overload cam 159, as shown in Fig. 10d, the angle between the engaging surfaces 155b and 159b is such that the overload cam 159 is moved out of the path of the plunger cam 155. As soon as the plunger cam clears the overload cam, the spring 150, which has been compressed by the movement of the plunger, causes the tripping lever 120 to return the cam 159 to its latching position shown in Fig. 10a.

With the parts in the position shown in Figs. 1 and 2 it will be assumed that an overload occurs on the motor operating the cooling apparatus of the refrigerator. That part of the motor circuit through the circuit controlling device 10 may be traced from the terminal 23 by the conductor 19, conducting screw 18, conductor 17, stationary contact 14, movable contact 16, bronze conductor 26, contact operating member 28, flexible conductor 181 (Fig. 2), heating coil 182 secured in spaced relation with the bimetal thermal element 124, and by conductor 186 to conductor 24 (Fig. 1), which as stated above leads to the other terminal connection.

The heat developed by the flow of the overload current through the heating coil 182 causes the thermal element 124 to flex and move its end 123 out of engagement with the end 120a (Fig. 2) of the tripping lever 120, thereby permitting the tripping lever 120 to rotate in a counter-clockwise direction about its pivot 121. This rotation, as I have stated, is due to the component of force from the spring 150 applied to the tripping lever through the plunger cam 155 and the overload cam 159. As shown in Fig. 10e, the overload cam 159 is moved in the direction of the arrow out of engagement with the plunger cam 155. As soon as the cams disengage, the spring 150 applies its full force on the tripping member 120 to accelerate its movement in the counterclockwise direction.

At the same time the plunger 136 is also freed to move longitudinally to operate the cam 115 and the button 170 to the position shown in Fig. 3, and thereby reset the tripping member 120. Thus as the button 170 moves outwardly from the position shown in Fig. 4, the leg 113 of the contact operating member 28 is engaged by the surface 114 of the cam 115 to hold the contacts in the open circuit position. The inclined surface 190 of the cam 115 then moves against one end 192 of the tripping member 120, causing the tripping member 120 to be returned to its original position shown in Fig. 3. As soon as the thermal element 124 cools it returns to its original latching position.

If automatic resetting were not provided for, the outer end 123 of the bimetal element 124 would strike against the projection 120a and, of course, in moving the projection 120a back to its original position, the bimetal element would be flexed, possibly enough to change the calibration. However, by immediately resetting the tripping member 120, the thermal element is free to return to its original position.

Figure 4:
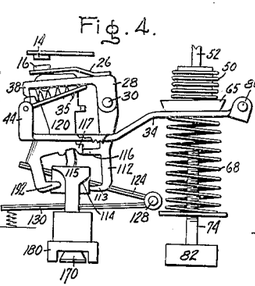
Figure 5:
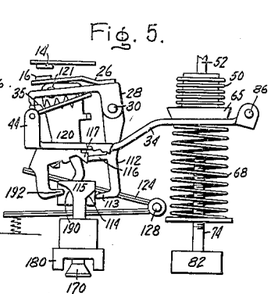

In case the button 170 is held in the closed circuit position shown in Fig. 1 at the time the overload occurs, the thermal element 124 will free the overload tripping member 120, as before, and it will rotate in a counterclockwise direction until its projection 117 strikes the end of the leg 116 of the contact operating member 28. The force of the spring 150 is sufficient to move the contact operating member 28 to the open circuit position irrespective of the button 170 or the position of the over-center spring 35. It will, therefore, be seen that the circuit controlling device 10 is trip-free, i. e., it can not be maintained in the closed position by the operating handle upon the occurrence of an overload. The final positions of the parts with the button 170 held in the closed circuit position are shown in Fig. 4.

It will be apparent from the operations already described that the spring 150 performs a plurality of functions. It biases the tripping member 120 in a direction to open the contacts; it biases the plunger for longitudinal movement to the open circuit position, and it also serves to reset automatically the tripping member 120 after the overload operation of the circuit controlling device has occurred.

In case the button 170 should be moved from its open circuit position to the closed circuit position before the thermal element 124 has cooled sufficiently to hold the tripping member 120 in its normal position, it will be seen that the tripping member 120 will rotate in a counter-clockwise direction, thereby moving the overload cam 159 from alinement with the plunger cam 155. The closing of the circuit controlling device depends upon these cams being locked together and, of course, this is impossible until the tripping member 120 is locked into its normal position shown in Fig. 1 by the bimetal thermal element 124.

The thermal element 130 responsive to the ambient temperature serves to adjust the overload operation of the device so that the current required for tripping remains constant. Thus as the ambient temperature rises, the element 130 flexes or bends in a direction to rotate the insulating member 127 and the overload thermal element 124 in a clockwise direction as viewed in the drawings to compensate for the flexure of the element 124 due to the increased ambient temperature. Since the movement required of the element 124 to release the overload member 120 is therefore the same under the increased ambient temperature the device operates to open the circuit on the same value of current as for a lower ambient temperature. The motor is thus operated at its full capacity irrespective of ambient temperature conditions.

It will be observed that the shank 172 of the cam 115 is slidably mounted within a control knob 180. Normally the knob 180 occupies the position shown in Figs. 1 and 2. However, by rotating the knob 180 in one direction or the other, the control device 10 will function so as to cause the temperature of the refrigerator to rise above the normal average temperature for defrosting the refrigerator, or to fall below the normal average temperature for quick freezing. As is well understood by those skilled in the art, after the refrigerator operates for a period of time, frost accumulates on the evaporator. By means of the present invention, the frost can be removed by simply permitting the refrigerator temperature to rise above the melting temperature of the frost. This upper limit is arbitrarily selected and it may be assumed to be 50° F. Provision is made so that the temperature does not vary more than a few degrees from this temperature. The time during which the defrosting occurs is that period during which the temperature of the evaporator is above 32° F. In accordance with my invention, as soon as a temperature of approximately 50 degrees is reached, the refrigerator automatically resumes its normal operating cycle under the control of the device 10.

In order to initiate the defrosting cycle of operation the knob 180 is rotated in a counter-clockwise direction, as viewed in Figs. 1 and 2, the result of which is the application of additional spring pressure on the operating lever 34 in a direction opposing the expansion of the bellows 50. Since the pressure exerted by the bellows increases with a rising temperature this additional pressure will be overcome as soon as a corresponding higher temperature is attained in the refrigerator. The bellows 50 then operates the circuit controlling device to the closed circuit position. This additional spring pressure is obtained by means of a torsion coil spring 200 (Fig. 2) supported on a post 202, one end 204 of the spring bearing against a defrosting lever 206 pivotally supported on the post 202. The opposite end 208 of the spring 200 rests against a threaded collar 209 mounted on an adjusting screw 215, extending through and supported by the spring seat 72. The spring 200 normally biases the defrosting lever 206 for rotation in a clockwise direction, as viewed in Figs. 1 and 2. One end 216 of the defrosting lever 206 bears against a defrosting cam 218 which cam is provided with a square opening 219 (Fig. 13) into which extends the square projection 220 formed integrally with the knob 180. As the knob 180 is turned toward the defrosting position, a recess 221 formed in the cam is brought into registering relation with the extension 216 so that a predetermined clockwise rotation is permitted for the defrosting lever 206. This clockwise rotation moves an extension 225 of the defrosting lever 206 into registering relation with a roller 230 supported on an arm 231 formed integrally with the switch operating lever 34.

Figure 6:
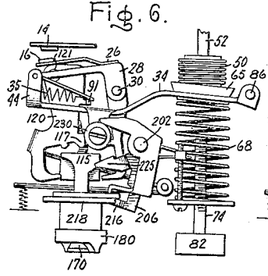
Figs. 6 to 9 inclusive, are fractional plan views of the switch mechanism showing the parts in position for semi-automatic defrosting and semi-automatic quick freezing operations.
Figure 7:
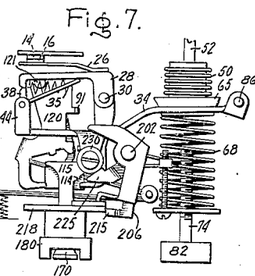

The positions of the parts for the defrosting operation are shown in Fig. 6. As the temperature of the refrigerator rises to the predetermined high temperature, the pressure of the bellows 50 rotates the operating lever 34 in a counter-clockwise direction, this movement being opposed by temperature control spring 68, and the defrosting spring 200. The roller 230 after engagement with the extension 225 of the defrosting lever 206 rotates the defrosting lever 206 in a counter-clockwise direction until the end 216 is removed from the recess 221 in the defrosting cam. As soon as the extension 216 clears the recess, the centering spring 235 (Figs. 2 and 13) quickly returns the knob 180 to its original position shown in Figs. 1 and 2. The centering spring 235, as shown in Fig. 2, is coiled around the knob 180 with its ends 235a and 235b located on opposite sides of a stop 236 formed integrally with the front end wall 76 of the casing 12, and a projection 237 formed integrally with the cam 218. Thus when the knob is rotated in either direction the energy normally stored in the spring 235 is increased. Due to the shape of the recess 221, however, the coil spring 235 cannot apply sufficient force to the extension 216 to move it from the recess. If the knob 180, however, is forcibly rotated from the defrosting position to the normal position, the increased force applied through the cam to the extension 216 is sufficient to move it back to its original position.

Since the temperature control spring 68 is adjustable, it will be seen that the defrosting temperature will vary unless the force of the spring 200 is varied inversely with the change in pressure exerted by the spring 68. The necessary compensation is obtained by the movement of the end 208 of the torsion spring 200 with the spring seat 72 provided for the temperature control spring 68. Thus as the temperature control knob 82 is rotated in a counter-clockwise direction the spring seat 72 moves to increase the spring pressure against the operating lever 34. The movement of both the screw 215 and the collar 209 with the spring seat rotates the end 208 of the torsion spring 200 in a counter-clockwise direction, as viewed in Figs. 1 and 2, to decrease the pressure exerted by the spring 200 on the defrosting lever 206 a corresponding amount.

Figure 8:
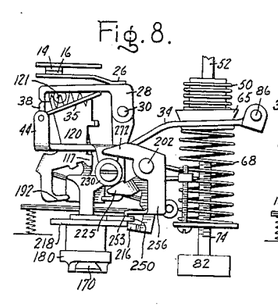
Figure 9:
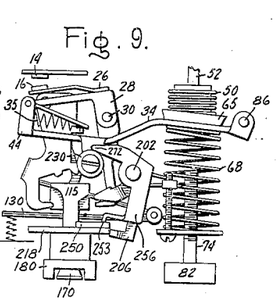

In case it is desired to reduce quickly the refrigerating temperature to a predetermined low or quick freezing temperature, for example, 6 degrees Fahrenheit, the knob 180 is rotated in a clockwise direction against the bias of the centering spring 235. A quick freeze cam 250 secured to the defrosting cam 218 is rotated until a recess 251 is moved into registering relation with one end 253 of a quick freeze lever 256 pivotally mounted on the post 202. A quick freeze torsion coil spring 258 encircles the post 202, one end 255 of which bears against the quick freeze lever 256 while the other end 260 is held against rotation by a threaded collar 264. This collar is mounted on an adjusting screw 267 which is secured to the spring seat 72 by means of a lock nut 270. The force from the torsion spring rotates the quick freeze lever in a counter-clockwise direction, as viewed in Fig. 2, until the end 253 moves into the recess 251 while the opposite end 272 of the quick freeze lever is rotated to a position adjacent the roller 230, as shown in detail in Fig. 8.

Since the quick freeze spring 258 now acts in opposition to the temperature control spring 68 the pressure in the bellows must be reduced a correspondingly greater amount in order to move the contact 16 to its open circuit position. As soon as this predetermined low pressure is attained, corresponding to the assumed value of 6° F., the spring 68 moves the roller 230 carried by the operating lever 34 against the end 272 of the quick freeze lever 256 with sufficient force to rotate it in a clockwise direction. As soon as the end 253 of this lever clears the recess 251, the centering spring 235 returns the knob 180 to its normal position. The refrigerator then resumes its normal operating cycle.

If normal operation of the refrigerator is desired after either the defrosting or quick freezing operations have been initiated, it is only necessary to return forcibly the knob 180 to its normal position shown in Figs. 1 and 2. This return motion is permitted since the knob 180 is maintained in the quick freeze and the defrost positions by the frictional engagement of the cams 218 and 250 by the corresponding levers 206 and 256.

During the normal operating cycle the movable contact 16 remains in either its open or closed circuit position for a substantial time interval. For example, with a low ambient temperature the movable contact 16 may remain in the open circuit position for twenty minutes or more. Therefore, the end 272 of the quick freeze lever is arranged to be operated by the quick freeze cam 250 against the roller 230 so as to move the operating lever 34 to the closed circuit position in the event that the quick freeze setting is made when the lever 34 is in open circuit position. The quick freezing operation is accordingly initiated immediately. Since the knob 180 and the cam 250 close the contacts by moving the operating member 34, the overload tripping member 120 is effective at all times to open the circuit in response to an overload.

In accordance with a further aspect of my invention, I provide a vacation setting for the control device 10 whereby a higher average temperature is maintained in the refrigerator. Accordingly, beverages and the like can be maintained cool with a substantial saving in the cost of operation over the cost of operation for the normal cycle.

The vacation setting is obtained by rotating the temperature control knob 82 in a counter-clockwise direction to its minimum temperature position. A cam 290 (Fig. 2) provided with a notch 291 is rotated with the screw 74. As the knob 82 reaches its temperature position the notch 291 is moved into registering relation with an extension 292 provided on a U-shaped lever 293 pivoted at 86 and provided with a portion 295 normally arranged in spaced relation with the operating lever 34. As soon as the recess 291 is in registering relation with the extension 292, the portion 295 is operated into engagement with the operating lever 34 by means of a compression spring 296 mounted at one end on a spring seat 297 formed integrally with the member 293 and mounted at its opposite end on a spring seat 298 carried by a screw 299. The effect of adding the force of the spring 296 to the operating lever 34 is to require a correspondingly higher temperature in the refrigerator to produce sufficient pressure by the bellows 50 to operate the lever 34 to close the contacts.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A circuit controlling device comprising circuit control means, operating means for operating said circuit control means to open and close the circuit, a tripping member, means mounting said tripping member for movement from a normal to a tripped position to operate said control means to open the circuit independently of said operating means, a releasing member, latching means forming a connection between said releasing member and said tripping member, a spring, means mounting said spring so as to apply a bias to both of said members, overload means normally restraining one of said members against said bias, and said latching means restraining said other member, said overload means being operable upon overload to release said one member for movement to release said connection between said members whereupon said tripping member operates said control means to open the circuit.

2. A circuit controlling device comprising contacts at least one of which is operable between open and closed circuit positions, a tripping member, pivot means mounting said member for rotation between predetermined positions for causing said contact to move to said open circuit position, a releasing member, a spring located between said releasing member and said tripping member for applying a force to both of said members, a surface on one of said members inclined with respect to the line of action of said spring, a second surface on the other of said members urged by said spring into engagement with said first surface, said spring through said surfaces applying only a fraction of its force to move said tripping member and thereby operate said contacts to said open circuit position, overload responsive means normally restraining said tripping member but operable on overload to free the same, whereupon said tripping member rotates to disengage said surfaces, and said spring then applies its maximum force on said tripping member to operate said contact to said open circuit position.

3. A circuit controlling device comprising a pair of contacts, means for moving one of said contacts relatively to the other between open and closed circuit positions, a tripping member, means mounting said tripping member for movement from a normal to a tripped position to operate said contacts to said open circuit position, a releasing member, a spring for applying a bias to move both of said members, latching means between said tripping member and said releasing member for reducing the bias on said members and for restraining said tripping member in said normal position, and an overload means for causing release of said latching means.

4. A circuit controlling device comprising a circuit control means operable to open and close a circuit, a tripping member, a releasing member, spring means for applying a force to bias said members in predetermined directions with respect to each other, said members being provided with bearing surfaces normally in engagement with each other, said bearing surfaces being inclined with respect to the force applied by said spring means whereby a relatively small component of said force is applied to move said members, means for restraining said releasing member against said component of force, overload responsive means normally restraining said tripping member but freeing said tripping member upon the occurrence of a predetermined overload whereupon the full amount of said force is applied to said tripping member to operate said control means to open the circuit, and a stop for said releasing member.

5. A circuit controlling device comprising control means for opening and closing the circuit, a tripping member operable from a normal position to an overload position to operate said control means to open said circuit, a second member operable between a normal position and a second position, a spring for applying a force to both of said members, an overload device for restraining one of said members in said normal position against the bias of said spring and operable in response to an overload to free said tripping member for operation to said overload position, a connection between said one member and the other member for restraining said other member in said normal position, and means cooperatively related with both of said members and operable by said spring after said tripping member moves to said overload position to return one of said members to its normal position.

6. A circuit controlling device comprising a tripping member operable from a normal position to an overload position, a second member operable between a normal position and a second position, a spring one end of which acts on said tripping member and the other end of which acts on said second member for biasing said members from said normal positions to said overload and said second positions, restraining means for restraining one of said members in said normal position, a latching means operable by said one member for restraining said other member in said normal position, and means cooperatively related with both of said members for returning one of said members to its normal position after both of said members have been operated respectively to said overload and said second positions.

7. A circuit controlling device comprising a pair of contacts one of which is operable with respect to the other between open and closed circuit positions, a tripping member operable from a normal postion to an overload position for operating said contacts to said open circuit position, a second member operable between a normal position and a second position, a spring normally applying a force biasing both of said members from said normal positions, restraining means for holding one of said members in its normal position, latching means for holding said other member in its normal position and operable by movement of said one member from said normal position for releasing said other member, and a member having an inclined surface operable by movement of one of said members for returning the other of said members to its normal position.

8. A circuit controlling device comprising a pair of contacts one of which is operable with respect to the other between open and closed circuit positions, a tripping member for causing the operation of said contacts to said open circuit position, a plunger, cooperating inclined surfaces formed on said plunger and said member, a spring normally acting to move said tripping member, overload means restraining said tripping member against movement by said spring but operable on overload to free said tripping member for operation by said spring, said inclined surfaces providing for relative movement between said plunger and said tripping member and for a reduction in the opening force of said spring when said surfaces are in engagement.

9. A circuit controlling device comprising a contact member operable between open and closed circuit positions with a snap action, an overload tripping member, a thermal responsive element normally maintaining said tripping member in a first position, a spring for biasing said tripping member for movement from said first position to a second position to operate said switch member from said closed position to said open position, a plunger arranged to be acted upon by said tripping spring, latching means between said plunger and said tripping member arranged to be freed by predetermined movement of said tripping member for applying the force of said spring on said plunger to operate said plunger from one position to another, said plunger being provided with means for returning said tripping member to said first position and for maintaining said switch member in said open circuit position, said latching means being adapted to be reset by operation of said plunger to said one position.

10. A circuit controlling device provided with a switch member operable between open and closed circuit positions, an operating member for said switch member, overload responsive means for operating said switch member from its closed to its open circuit position upon the occurrence of a predetermined overload current, comprising a tripping member, a tripping spring normally biasing said tripping member into engagement with said switch member, a thermal responsive device for freeing said tripping member for operation by said tripping spring, a cam operable by said spring into engagement with said switch member, and means operable by said spring for returning said tripping member to its first position as said cam is operated into engagement with said switch member.

11. A circuit controlling device comprising a switch member operable between open and closed circuit positions, an overload tripping member, means pivoting said tripping member for rotation into engagement with said switch member, a spring for biasing said tripping member for said rotation, a plunger having one end supporting said spring and the opposite end provided with a projection, a cam provided with a recess for receiving said projection, a three surface cam mounted on said tripping member, a second three surface cam mounted on said plunger, one face of said second cam being arranged to engage one surface of said first cam to lock said plunger in position with said spring under compression, said extension and said angular recess permitting rotation of said plunger in a direction to release said cams one from the other and to permit the opening of said circuit controlling device.

12. A circuit controlling device comprising a switch member operable between open and closed circuit positions, an operating member for said switch member, a tripping member operable from a first position to a second position for operating said switch member from said closed circuit position to said open circuit position irrespective of the position of said operating member, a spring for biasing said tripping member for movement from its first to its second position, and a cam provided with one surface operable into engagement with said switch member to maintain the same in said open circuit position and a second surface operable into engagement with said tripping member to return the same to said first position after its operation to said second position, said spring biasing said cam for operation against said switch member and to return said tripping member to said first position.

13. A circuit controlling device comprising a switch member operable between open and closed circuit positions, an operating lever, an over-center spring connected between said operating lever and said switch member for producing a snap action of said switch member, overload responsive means for operating said switch member from said closed circuit position to said open circuit position irrespective of the position of said operating member comprising a tripping member operable from a first position to a second position to move said switch member to said open circuit position against the bias of said over-center spring, a spring connected to said tripping member, a cam provided with two surfaces one of which cooperates with said switch member and the other of which cooperates with said tripping member, connecting means between said spring and said cam operable by predetermined movement of said tripping member to operate said cam into engagement with said tripping member and said switch member to maintain the switch member in said open circuit position and to return said tripping member to said first position, and a bimetallic thermal element normally maintaining said tripping member in said first position and operable in response to a predetermined overload current to free said tripping member to initiate said overload tripping of said switch member.

14. A circuit controlling device comprising a switch member operable between open and closed circuit positions, an overload tripping member, means mounting said tripping member for rotation into engagement with said switch operating member, a spring for biasing said tripping member for said rotation, a plunger having one end supporting said spring and the opposite end being provided with a pointed projection, a cam provided with a recess for receiving said pointed projection of said plunger, latching means for maintaining said plunger in a predetermined position comprising a three surface cam mounted on said tripping member and a second three surface cam mounted on said plunger, one face of said second cam being arranged to engage said face of said first cam to lock said plunger in position with said spring under compression, a thermal element normally maintaining said overload tripping member out of engagement with said switch operating member and operable in response to a predetermined overload current to free said tripping member for rotation by said spring to release said latching means, said spring first rotating said tripping member into engagement with said switch means and thereafter operating said plunger and said cam longitudinally, and means responsive to said longitudinal movement for returning said tripping member out of engagement with said switch member and for maintaining said switch member in said open circuit position until said cam is moved to reengage said three surface cams.

15. A circuit controling device comprising a pair of contacts, operating means for moving one of said contacts relatively to the other between open and closed circuit positions, a restraining member operable between a normal position and a second position, a spring normally biasing said restraining member to said second position, latching means including a pair of inclined engaging cam surfaces for holding said restraining member in its normal position, manual means for operating said restraining member to force relative sliding movement between said cam surfaces and thereby cause the release of said latching means, and means effective upon movement of said restraining member for applying the force of said spring to operate and to maintain said contacts in said open circuit position independently of said operating means.

16. A circuit controlling device comprising a switch member operable between open and closed circuit positions, a tripping member operable from a normal position to an overload position for operating said switch member to its open circuit position, a manual operating member, a plunger having one end slidably mounted in said tripping member and its opposite end supported by said manual operating member, a spring arranged between said plunger and said tripping member for biasing both of said members for movement, overload means normally holding said tripping member in said normal position, latching means carried by said tripping member and said plunger normally holding said plunger against movement by said spring, said latching means being releasable by movement of said tripping member or by movement of said plunger by said manual operating means, said switch member being operatively associated with both said plunger and said tripping member so as to be operated to its open circuit position by movement of either of said members.

17. A circuit controlling device comprising a switch member operable between open and closed circuit positions, an operating member therefor, temperature responsive means for moving said operating member between predetermined positions, an adjustable spring normally opposing the movement of said operating member by said temperature responsive means, and means for varying at any time by a predetermined amount the bias of said adjustable spring comprising a second spring, and a member biased by said second spring into the path of movement of said operating member, the opposite end of said second spring being connected to said adjustable spring so as to vary inversely the tension in said second spring with respect to the variation in tension of said adjustable spring and means normally maintaining said member out of said path of movement against the bias of said second spring, said last-mentioned means being operable to release said member for movement by said second spring into said path of movement.

18. A circuit controlling device comprising a switch member operable between open and closed circuit positions, an operating member therefor, temperature responsive means for moving said operating member between predetermined positions, an adjustable spring normally opposing the movement of said operating member by said temperature responsive means, and means for varying at any time by a predetermined amount the bias of said adjustable spring comprising a torsion spring, a member having one portion connected to said torsion spring, and operable into the path of movement of said operating member, the opposite end of said torsion spring being connected to said adjustable spring so as to vary inversely the tension in said torsion spring with respect to the variation in tension of said adjustable spring, a knob operable from a normal position to a second position for controlling said member, and a frictional connection between said knob and said member for maintaining said member into or out of said path of movement of said operating member, said knob being operable at will between said positions.

19. A circuit controlling device comprising a switch member operable between open and closed circuit positions, an operating member therefor, a temperature responsive means connected to said operating member for operating the same in response to predetermined temperature variation, a biasing means normally opposing said temperature responsive means, a member mounted for pivotal movement about an intermediate point to bring one end of said member into and out of the path of said operating member, a spring for biasing said pivoted member in a direction to oppose the movement of said operating member, a cam operable from a first position to a second position for moving said end of said pivoted member into the path of said operating lever, and a spring for biasing said cam to said first position, the connection between said cam and said pivoted member forming a latch between the other end of said pivoted member and said cam to hold said cam in said second position until said operating member operates said pivoted member to release said cam for rotation in accordance with its bias to its original position.

20. A circuit controlling device comprising a switch member operable between open and closed circuit positions, an operating member therefor, a temperature responsive means connected to said operating member for operating the same in response to predetermined temperature variation, a biasing means normally opposing said temperature responsive means, a member mounted for pivotal movement about an intermediate point to bring one end of said member into and out of the path of said operating member, a spring for biasing said pivoted member in a direction to oppose the movement of said operating member, a cam operable from a first position to a second position for moving said end of said pivoted member into the path of said operating lever, and a spring for biasing said cam to said first position, the connection between said cam and said pivoted member forming a latch between the other end of said pivoted member and said cam to hold said cam in said second position until said operating member operates said pivoted member to release said cam for rotation in accordance with its bias to its original position, said latch also being releasable by manual operation of said cam from said second position to said first position.

21. A circuit controlling device comprising a switch, an operating member movable between open and closed circuit positions, means for operating said switch operating member between said positions, a pair of members each provided with biasing means, cam means movable in one direction to operate one of said members in a direction to oppose movement of said operating member, said cam means also being movable in the opposite direction to operate said other member to oppose movement of said switch operating member, a centering spring for said cam means for biasing the same to its original position, each of said members forming latching means for maintaining said cam means in one or the other of its operated positions until after said switch operating member operates one or the other of said members to release said latching connection whereupon said centering spring returns said cam means to its original position.

22. In a control device, a control member movable to two opposite positions, condition responsive means tending to move said control member at times to one of said positions and at other times to the other of said positions and means for modifying the action of said control member as effected by said condition responsive means comprising a pair of elements, one manually movable to a position tending to resist movement of said control member to one of said positions and the other element manually movable to a position tending to resist movement of said control member to the other of said positions, said manually movable elements each positively moving said control member to the desired position if the control member is, at the time of operation of the element, in the undesired position.

23. In a control device, a control member movable to two opposite positions, condition responsive means tending to move said control member at times to one of said positions and at other times to the other of said positions, means for modifying the action of said control member as affected by said condition responsive means comprising a pair of elements, manually movable means to position one of said elements in position tending to resist movement of said control member to one of said positions and the other element tending to resist movement of said control member to the other of said positions, said elements each positively moving said control member to the desired position if the control member is, at the time of operation of the element, in the undesired position, a pair of arms biased toward each other, and a stop between said arms to determine a central position of said manually movable means, said manually movable means having a projection between said arms and adapted to move one of them away from the stop when the manually movable means is moved in one direction and the other away from the stop when it is moved in the opposite direction.

ERNEST ZURCHER.